(12) United States Patent
Schmidt (10) Patent No.: US 12,226,045 B2
(45) Date of Patent: Feb. 18, 2025

(54) BEVERAGE WARMER

(71) Applicant: Lake Wave LLC, Waconia, MN (US)

(72) Inventor: Jonathan Schmidt, Waconia, MN (US)

(73) Assignee: Lake Wave LLC, Waconia, MN (US)

(*) Notice: Subject to any disclaimer, the term of this patent is extended or adjusted under 35 U.S.C. 154(b) by 741 days.

(21) Appl. No.: 17/087,110

(22) Filed: Nov. 2, 2020

(65) Prior Publication Data

US 2022/0133084 A1   May 5, 2022

(51) Int. Cl.
  *A47J 36/26*   (2006.01)
(52) U.S. Cl.
  CPC ...................... *A47J 36/26* (2013.01)
(58) Field of Classification Search
  CPC ........................................ A47J 36/26
  USPC ................... 126/344; 431/289, 291
  See application file for complete search history.

(56) References Cited

PUBLICATIONS

Sun's Tea Universal Ceramic Teapot Warmer, first available on Amazon on Oct. 19, 2011 (Year: 2011).*

* cited by examiner

*Primary Examiner* — Vivek K Shirsat
(74) *Attorney, Agent, or Firm* — Kelly, Holt & Christenson; Joseph R. Kelly (57) ABSTRACT

A beverage warmer includes a base and a sidewall extending from the base to form a portion of a cavity wall. A support surface is disposed on the wall, generally opposite the base. The wall defines a window, for receiving a self-contained heating element. The support surface has a plurality of extending tabs that hold a container to be warmed in spaced relation to the support surface. The support surface also defines an aperture therein. The extending tabs are disposed about a periphery of the aperture to support the container to be warmed above the aperture.

15 Claims, 16 Drawing Sheets

BEVERAGE WARMER

BACKGROUND

There are a variety of different types of beverage heaters or beverage warmers currently in existence. Many such beverage warmers employ electricity, powered through a power cord. The power cord may directly deliver power from a wall outlet to power a heating element, or the power may be delivered through a universal serial bus (USB) connector, for example.

There are also other types of warmers that use a self-contained heating element, such as a candle. However, these types of warmers are often food warmers or other types of warmers which interpose multiple structural elements between the heating source and the substances to be heated. For instance, some food warmers use a combustible substance which is ignited. The flame produced by the combustible substance is used to heat a platform on which a food dish or other item to be heated is placed. However, this can result in an undesirable amount of heat loss in the transmission of the heat from the flame to the substance to be heated.

SUMMARY

A beverage warmer includes a base and a sidewall extending from the base to form a portion of a cavity wall. A support surface is disposed on the wall, generally opposite the base. The wall defines a window for receiving a self-contained heating element. The support surface has a plurality of extending tabs that hold a container to be warmed in spaced relation to the support surface. The support surface also defines an aperture therein. The extending tabs are disposed about a periphery of the aperture to support a container to be warmed above the aperture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Referring to FIGS. 1-16, a beverage warmer 100, in accordance with one example, includes a base 102 and an upwardly extending, curved wall 104. Wall 104 is connected at its first end 106 to base 102 and at its second end 108 to a vessel support member 110 that defines a generally planar vessel support surface 112, thereon. Support surface 112 illustratively defines a central aperture 114 which is shown, in the example illustrated in the current figures, as a generally circular aperture. A plurality of upwardly extending tabs 116 extend upwardly from the generally planar support surface 112.

Wall 104 (and possibly support member 110) also illustratively define a window 118 through which a self-contained heating element (such as a tea candle or other heating element) 120 can be received. Self-contained heating element 120 illustratively rests on an upper surface of base 102.

In one example, base 102, wall 104, and support member 110 are formed integrally with one another. In one example, tabs 116 are formed integrally with support member 110. For instance, beverage warmer 100 can be formed of clay or other ceramic materials. The support member 110 can be formed as an annulus, so that support surface 112 is formed as a generally planar surface, during the formation of beverage warmer 100. Window 118 can then be cut in wall 104, and tabs 116 can be integrally formed with support member 110 prior to firing beverage warmer 100. The parts of beverage warmer 110 can also be formed separately and coupled together such as with adhesive.

In another example, beverage warmer 100 is formed and fired without tabs 116. During the glazing process, tabs 116 (which may be separately formed) are then added to the support surface 112 of support member 110. The glaze can act to adhere tabs 116 to the upper surface 112, after which the beverage warmer 100 is fired again.

In one example, wall 104 forms a continuous curve that extends from one side of window 118 to an opposite side of window 118. Window 118 can also extend from base 102 to support member 110 and can extend by an angle α (shown in FIG. 3), about the center of base 102 where a is in a range of 45 degrees to 150 degrees or in a range of 75 degrees to 125 degrees.

In operation, a user may light a self-contained heating element, such as a tea candle 120, and place it within the cavity defined by wall 104 and base 102, to rest upon base 102, generally under the aperture 114 defined by support surface 112. The user can ignite the tea candle 120 before or after placing it on base 102 in the cavity. The user can also place a beverage-holding vessel (such as a mug), a portion of which is shown as numeral 130 in FIGS. 8 and 9, on tabs 116. Tabs 116 act as spacers to space the bottom of mug 130 from the support surface 112 so that air can move into the cavity through window 118, become heated by heat emitted from the flame on tea candle 120, and then pass upward around mug 130, between the bottom of mug 130 and the top of support surface 112, through a gap formed by tabs 116 as generally shown by the arrows in FIG. 9. In this way, the flame on heating element 120 can more effectively heat the contents of mug 130, as opposed to an example in which tabs 116 are not present, and mug 130 is resting directly on support surface 112, thereby covering aperture 114. Therefore, there may be more or fewer tabs 116 so long as they can support vessel 130 above aperture 114, and in spaced relation to surface 112.

Figure 1:
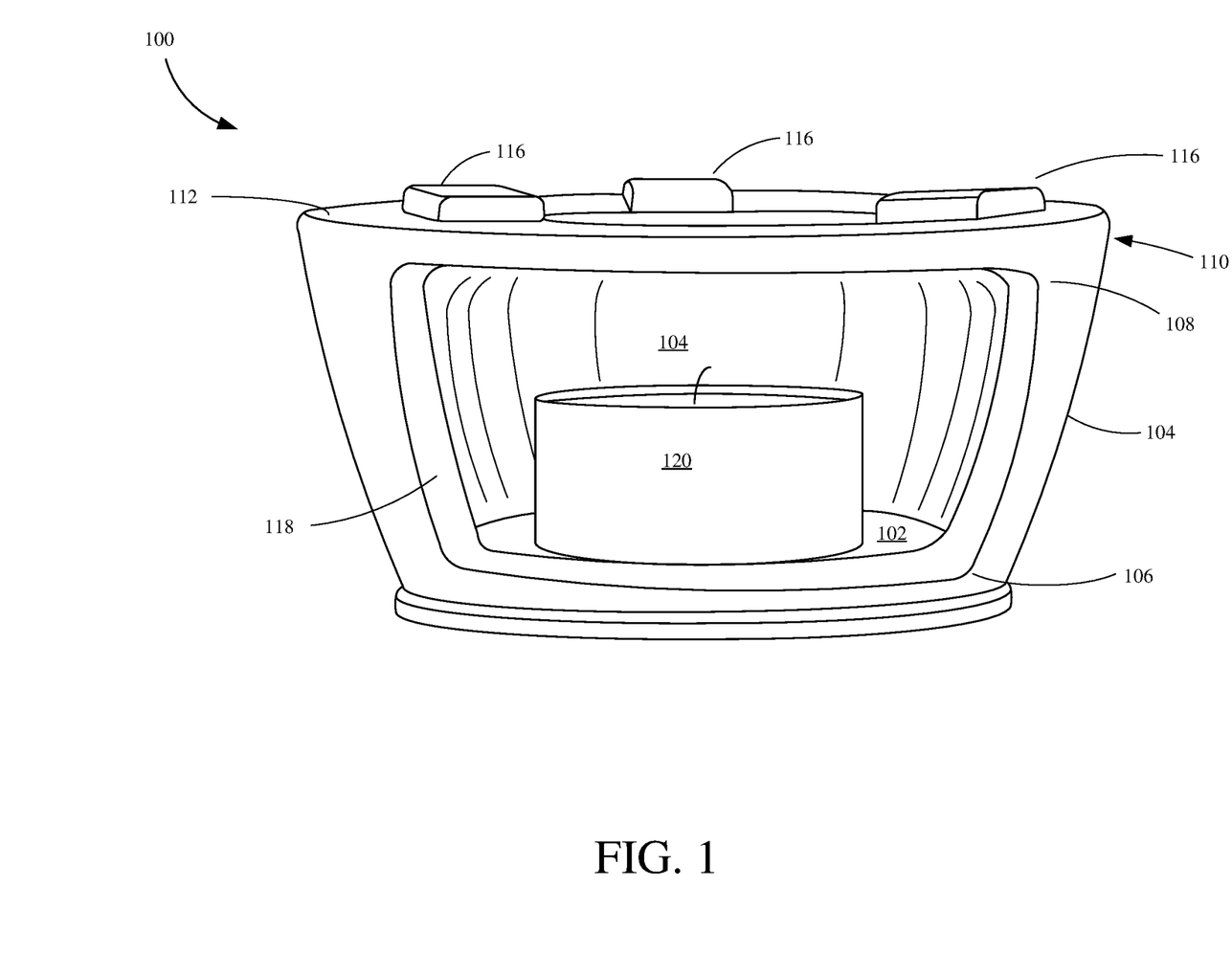
FIG. 1 is a front view of one example of a beverage warmer.
Figure 2:
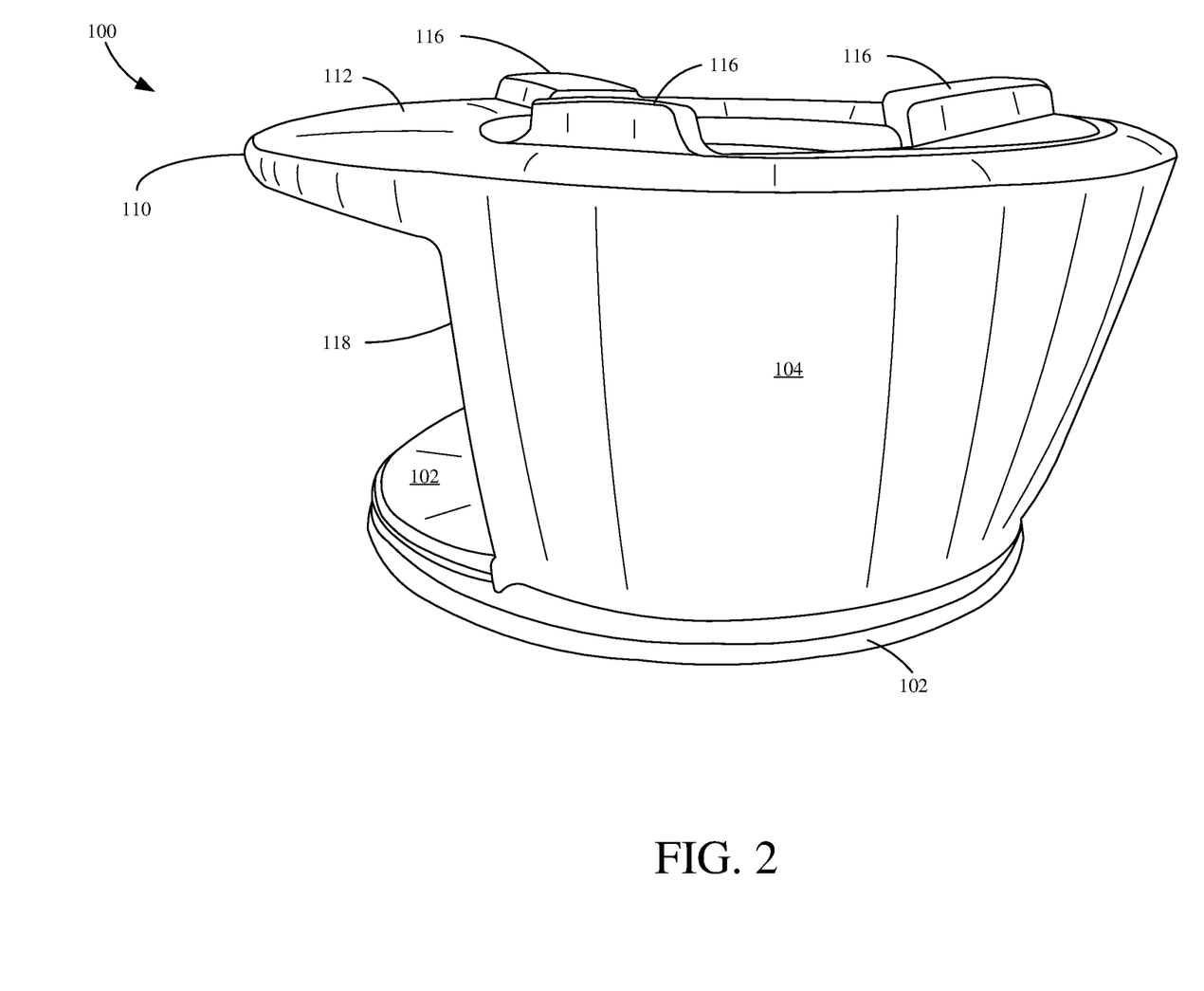
FIG. 2 is a left side view of one example of the beverage warmer.
Figure 3:
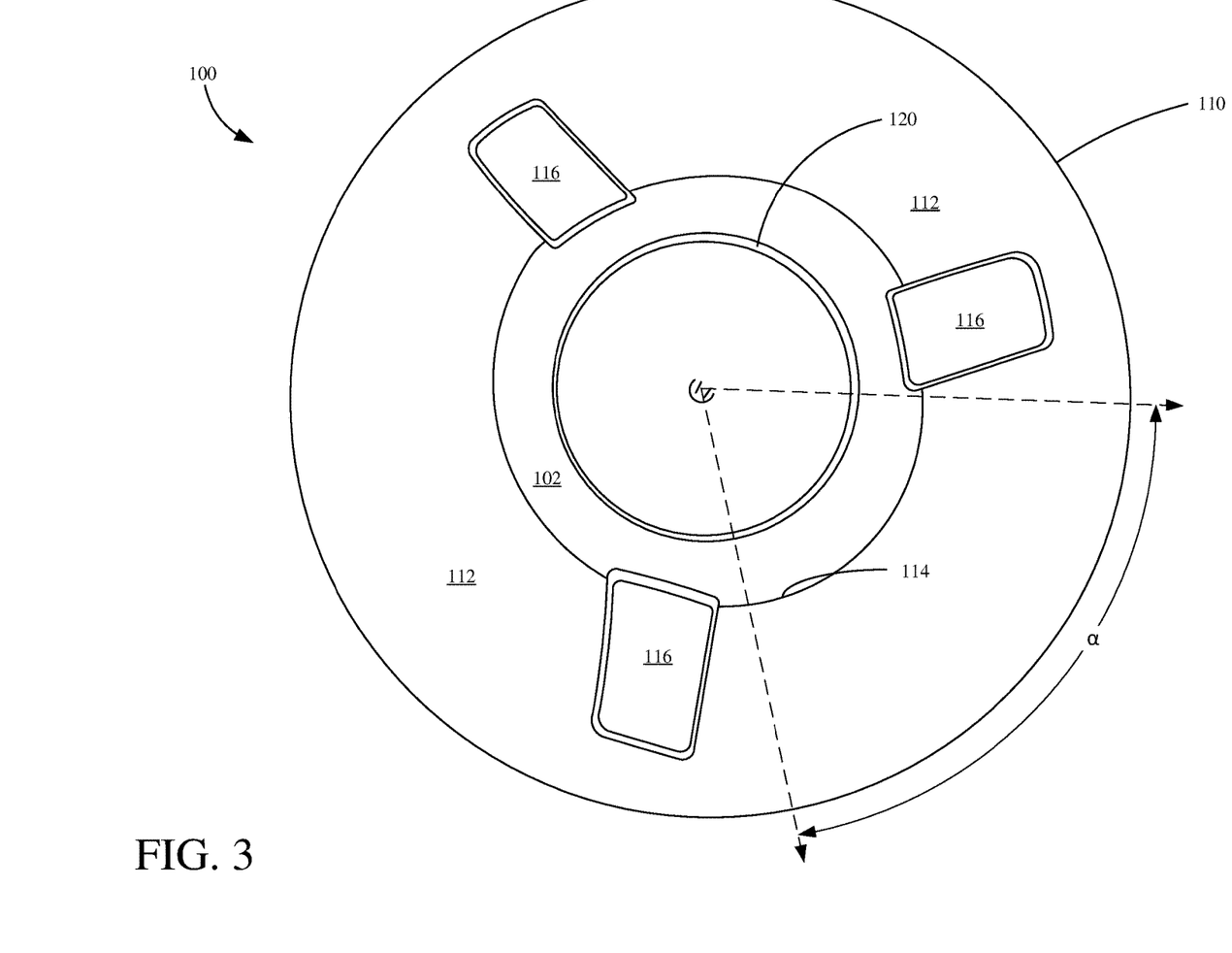
FIG. 3 is a top view of one example of the beverage warmer.
Figure 4:
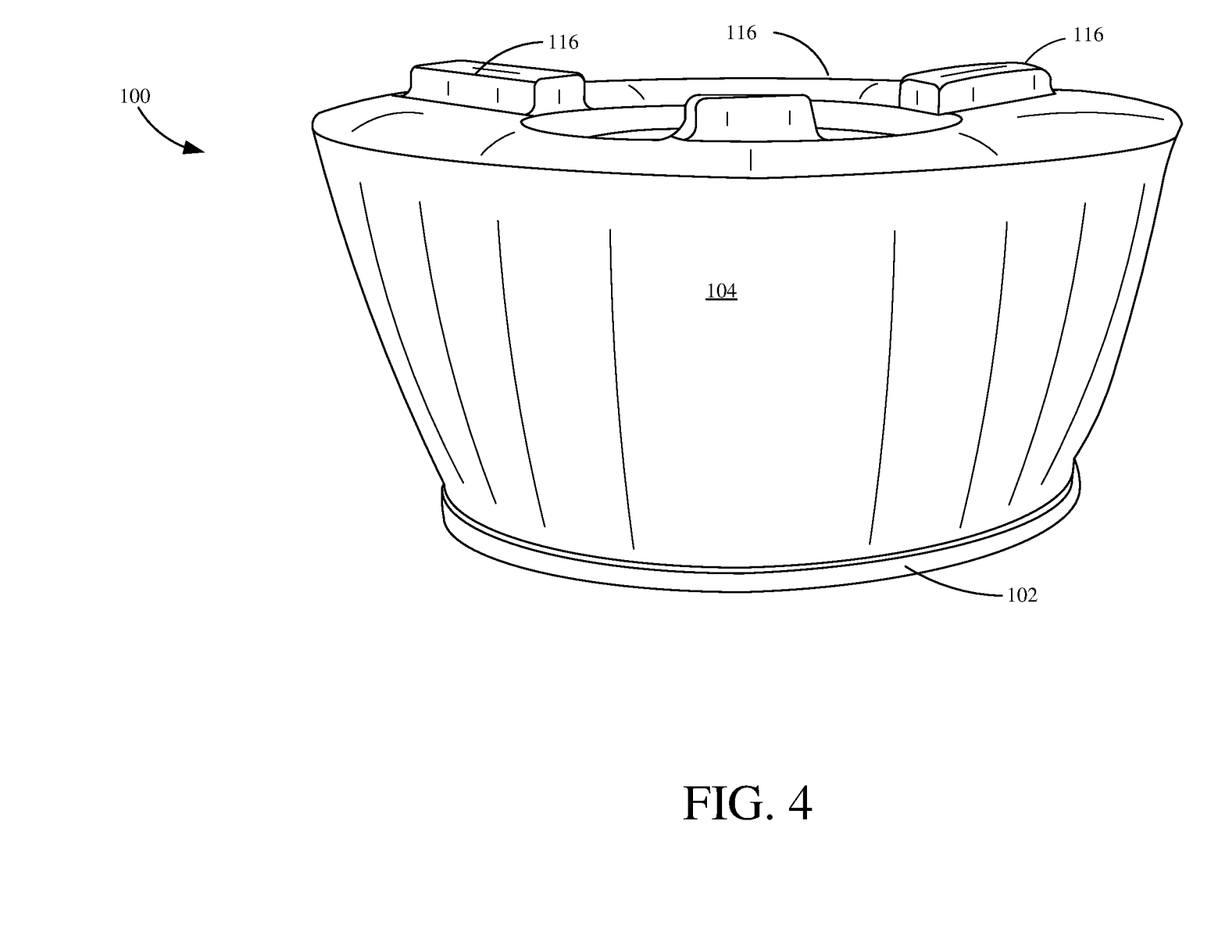
FIG. 4 is a rear view of one example of the beverage warmer.
Figure 5:
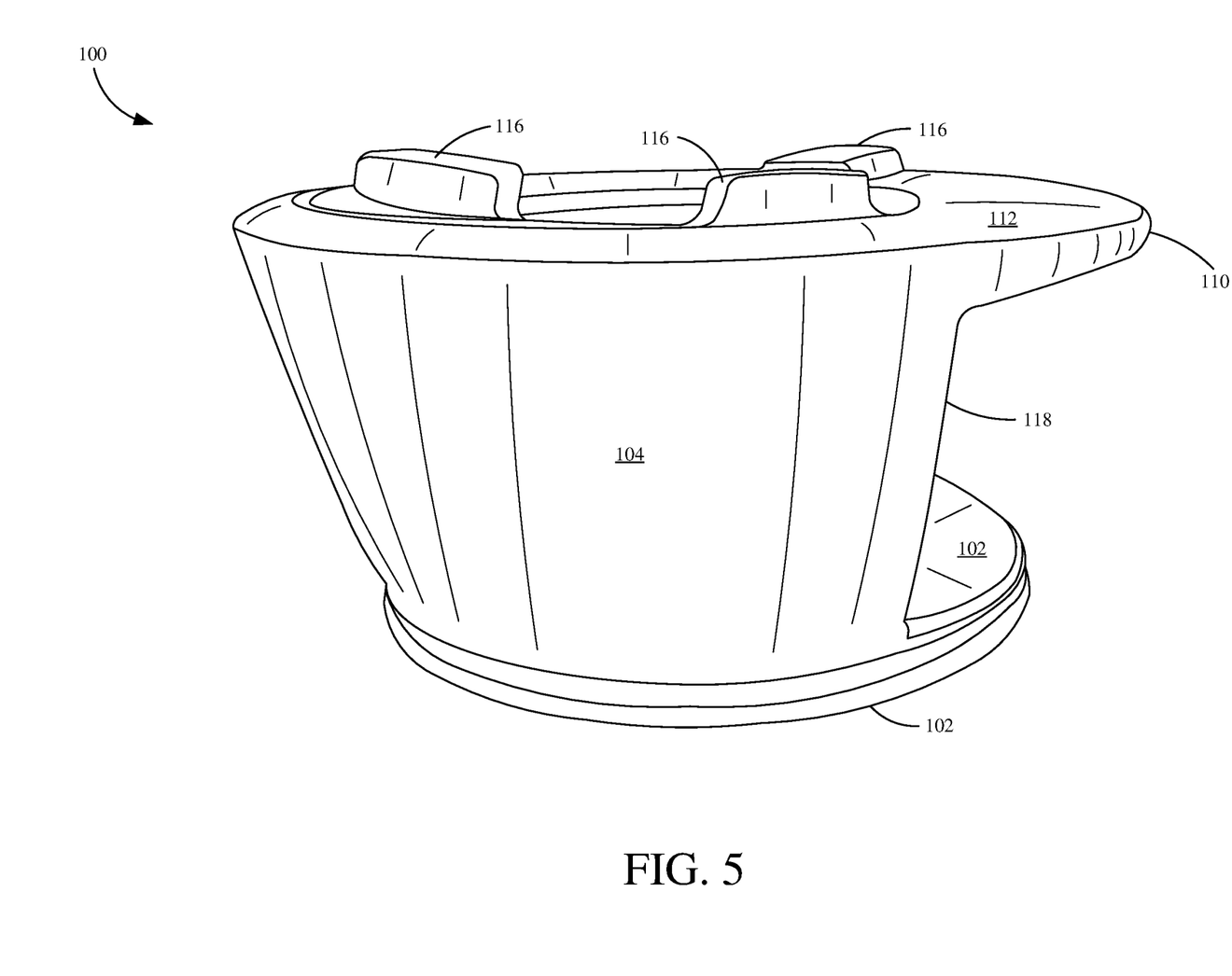
FIG. 5 is a right side view of one example of the beverage warmer.
Figure 6:
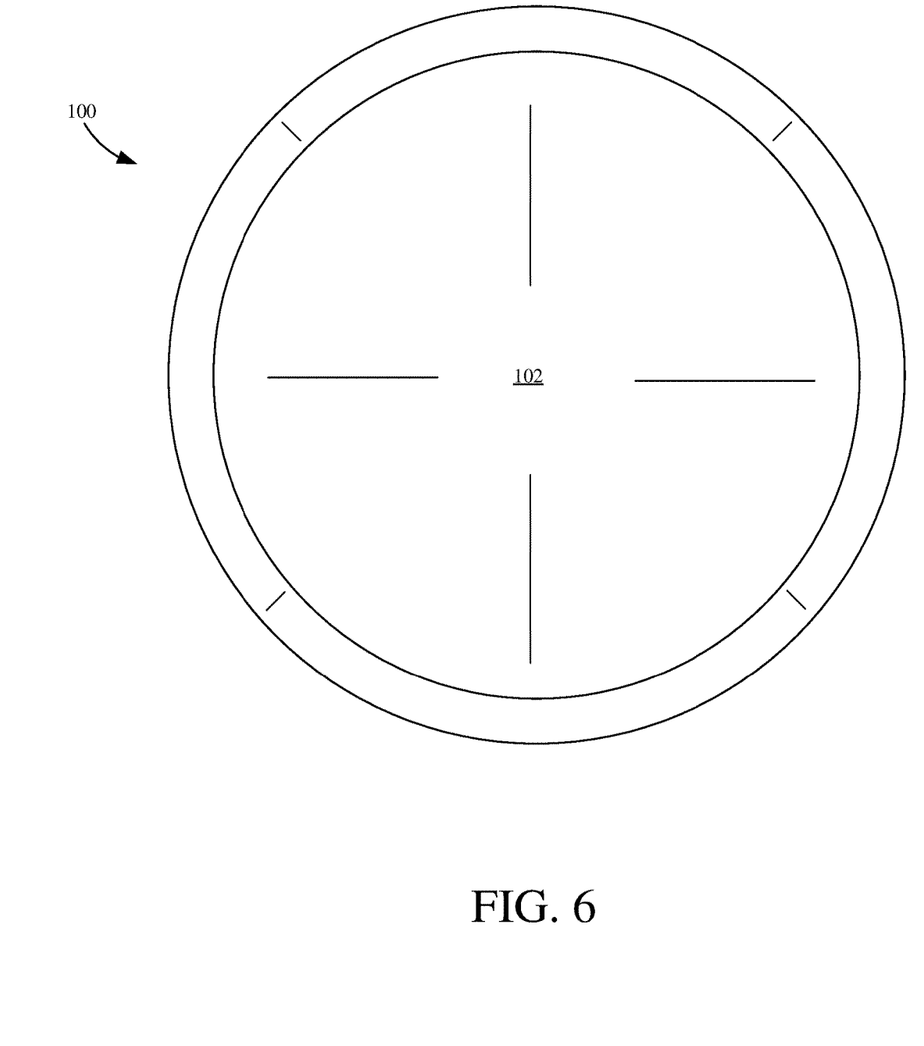
FIG. 6 is a bottom view of one example of the beverage warmer.
Figure 7:
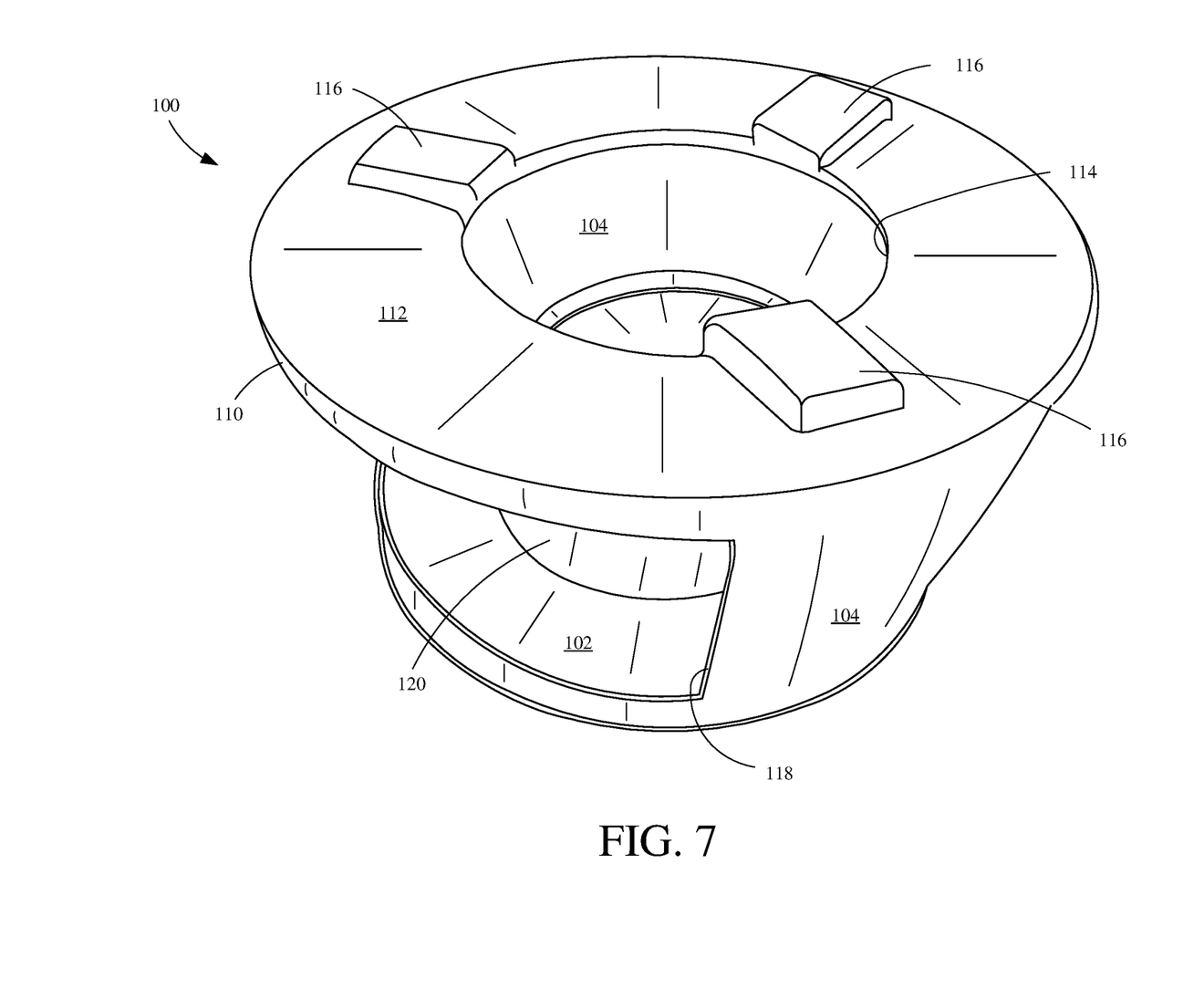
FIG. 7 is a perspective view of one example of the beverage warmer.
Figure 8:
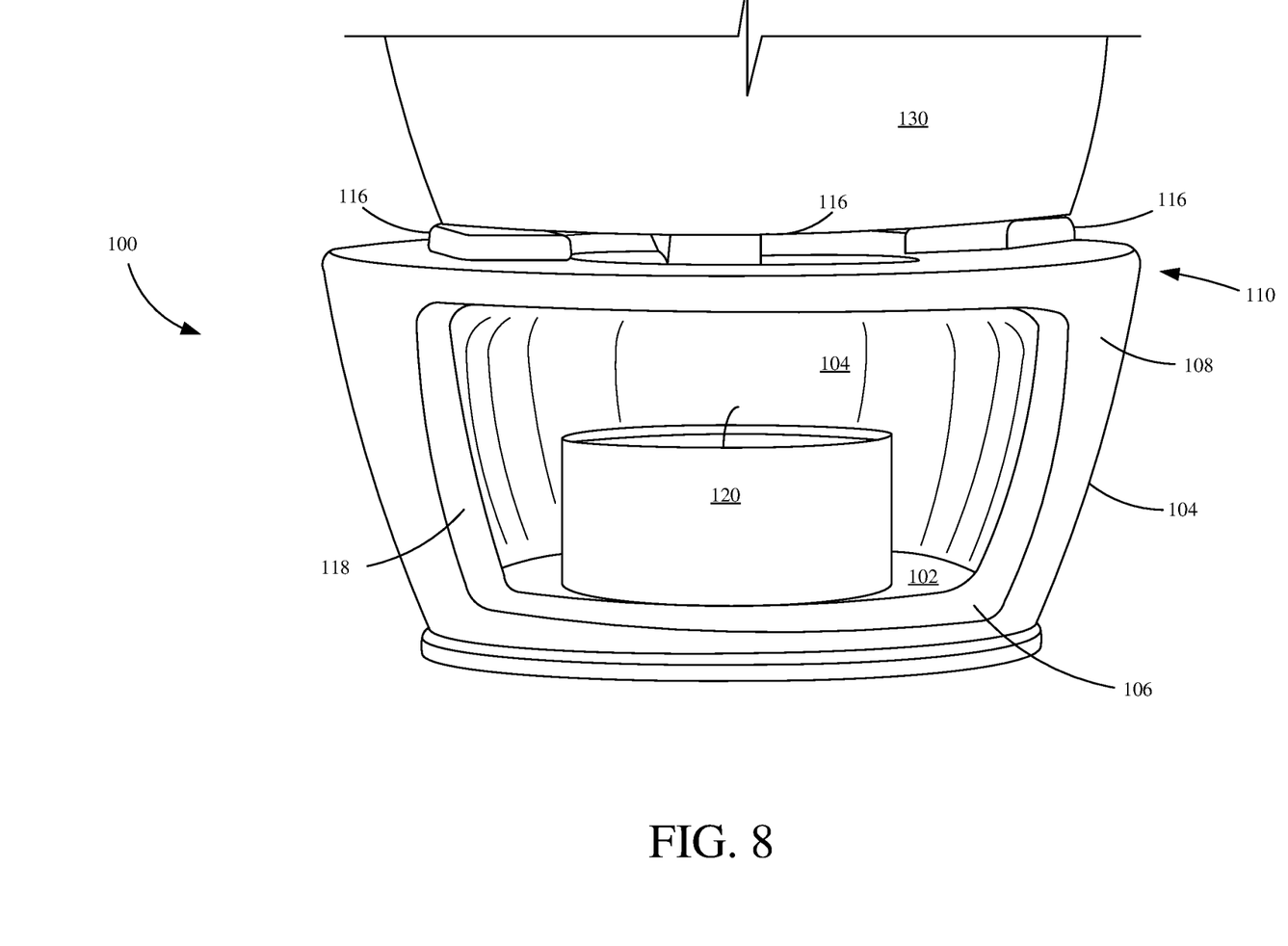
FIG. 8 is similar to FIG. 1, but showing a candle and a portion of a beverage container.
Figure 9:
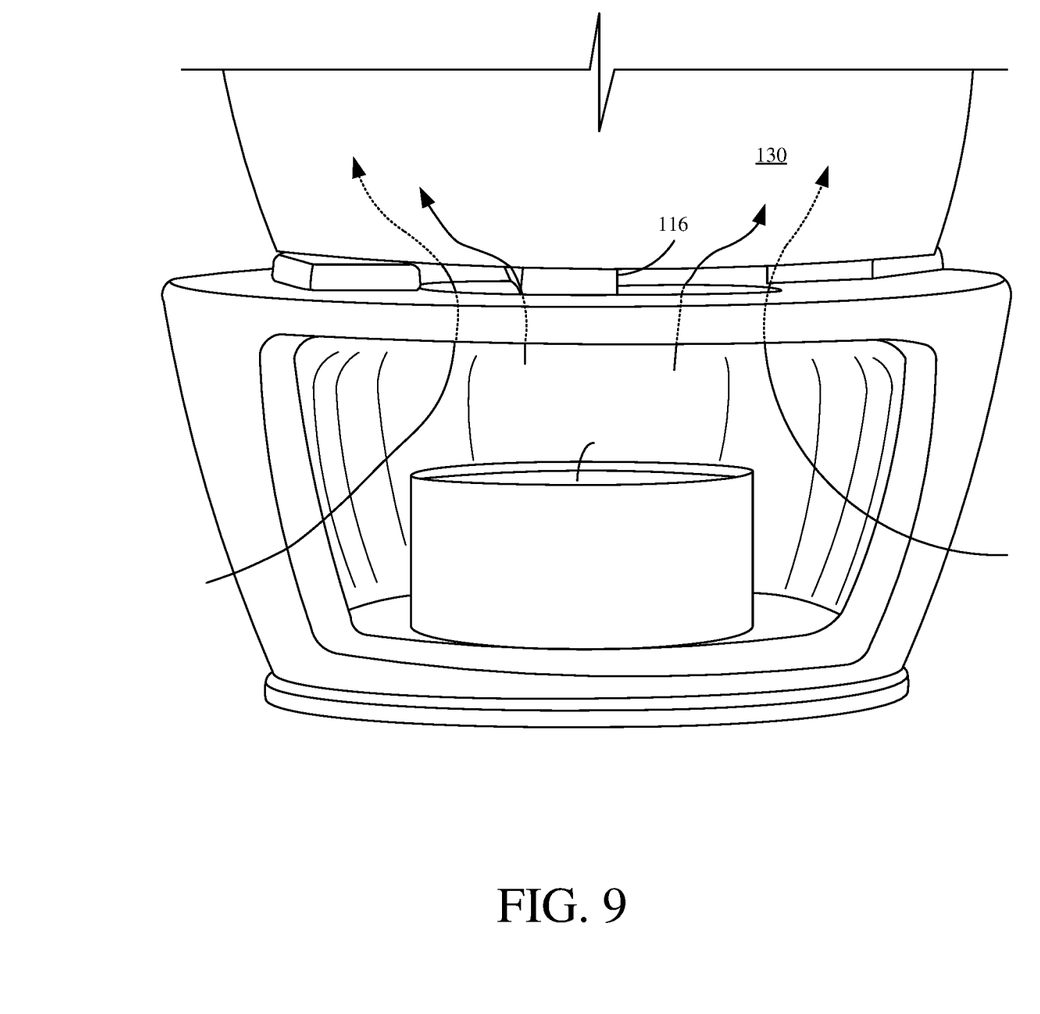
FIG. 9 is similar to FIG. 8 with airflow lines.
Figure 10:
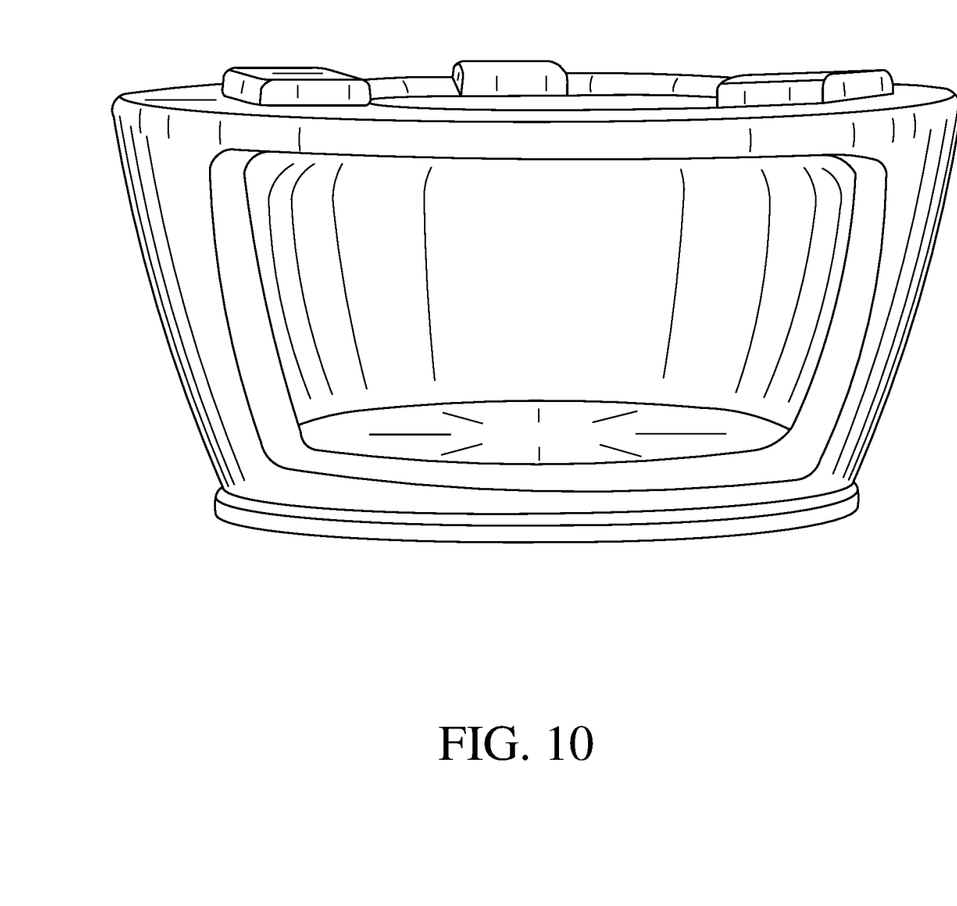
FIG. 10 is a front view of one example of a beverage warmer.
Figure 11:
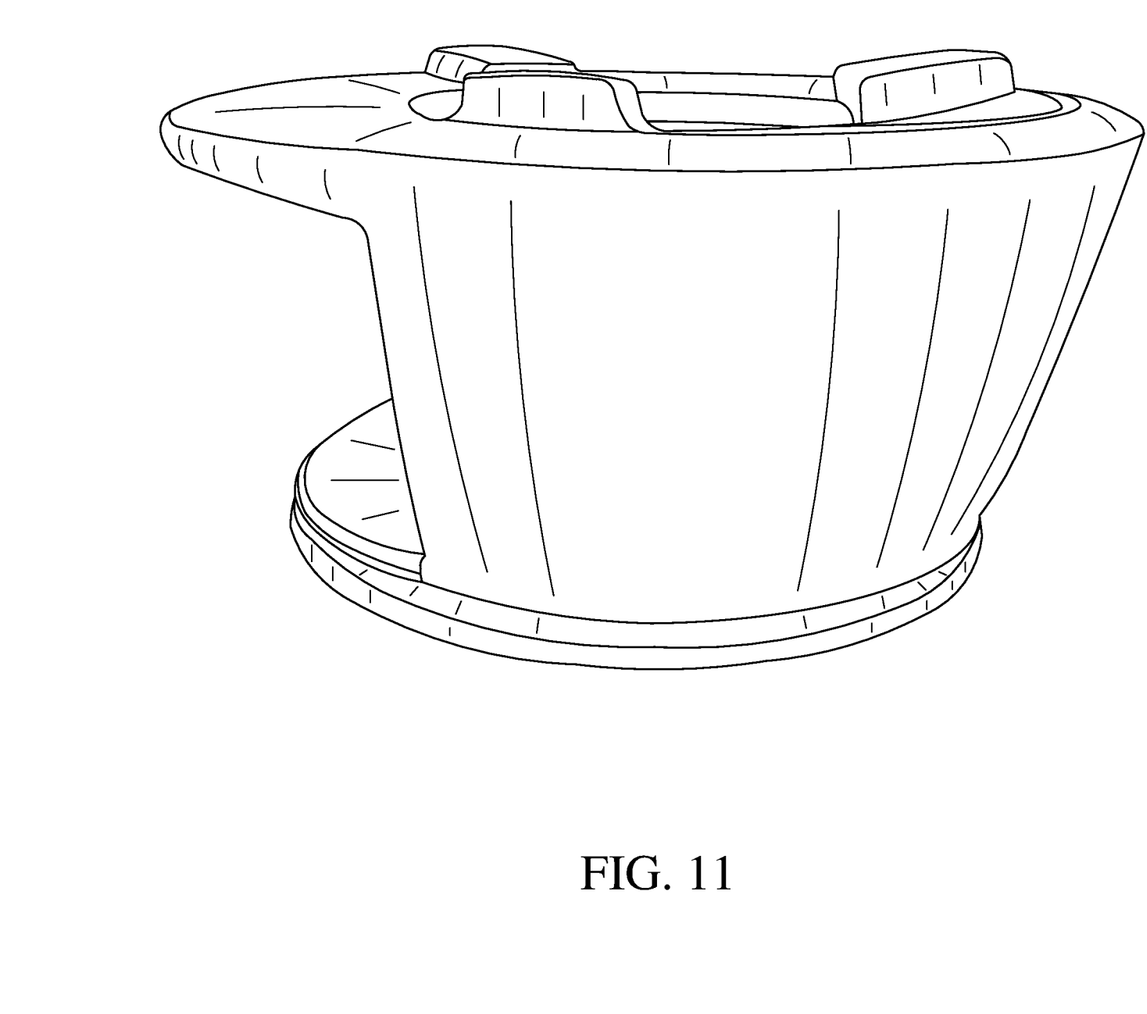
FIG. 11 is a left side view of one example of a beverage warmer.
Figure 12:
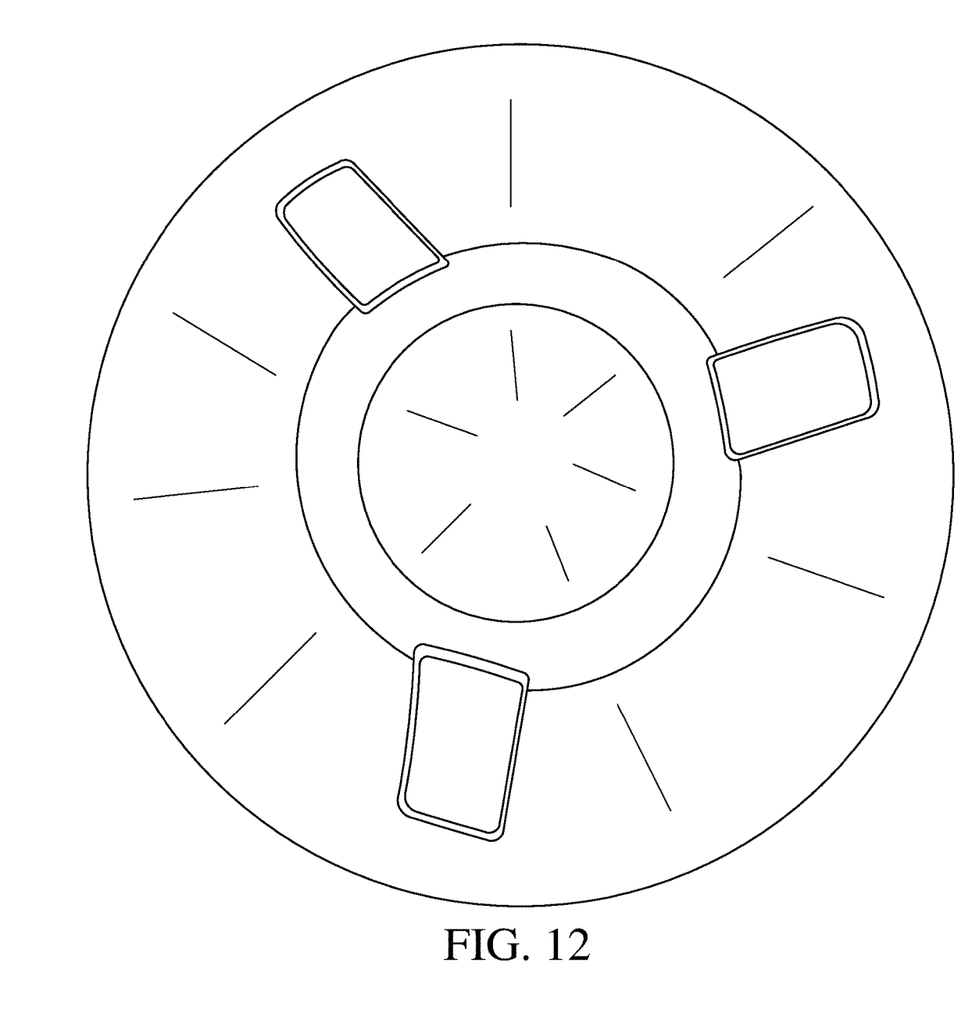
FIG. 12 is a top view of one example of a beverage warmer.
Figure 13:
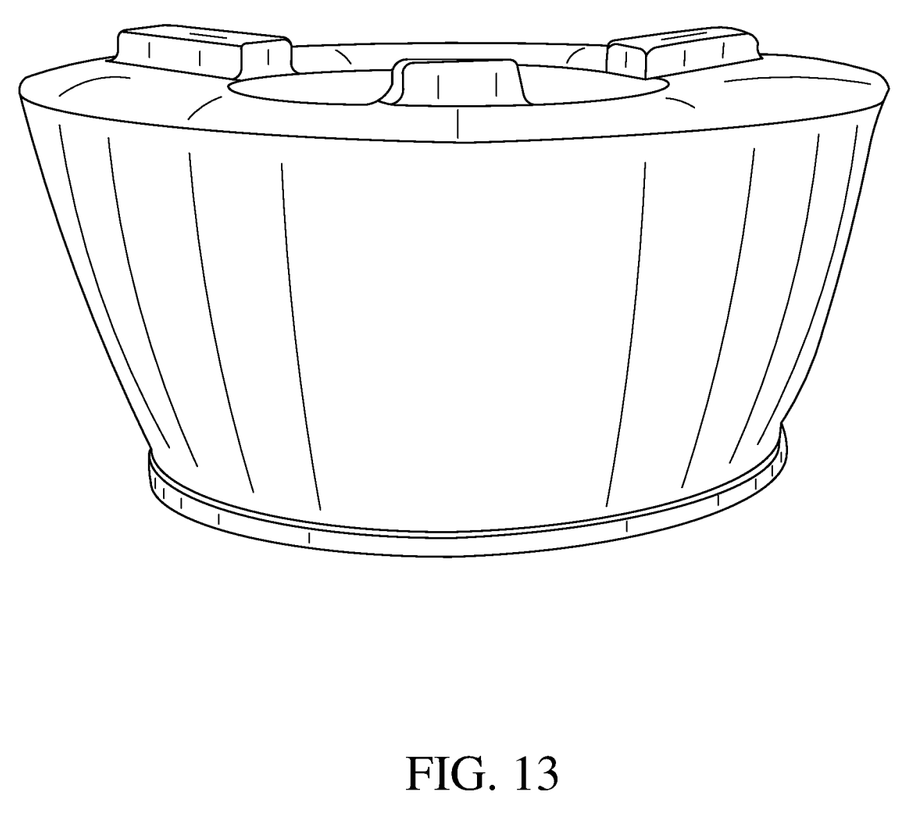
FIG. 13 is a rear view of one example of a beverage warmer.
Figure 14:
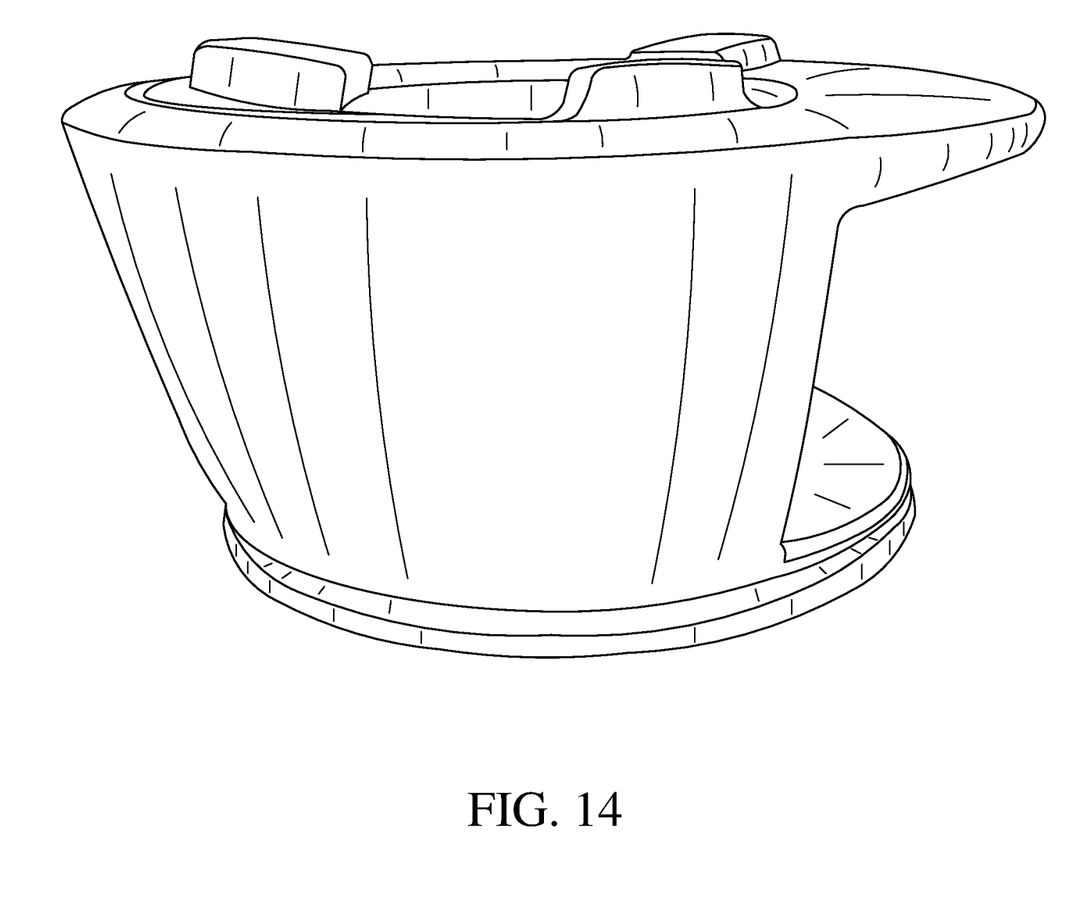
FIG. 14 is a right side view of one example of a beverage warmer.
Figure 15:
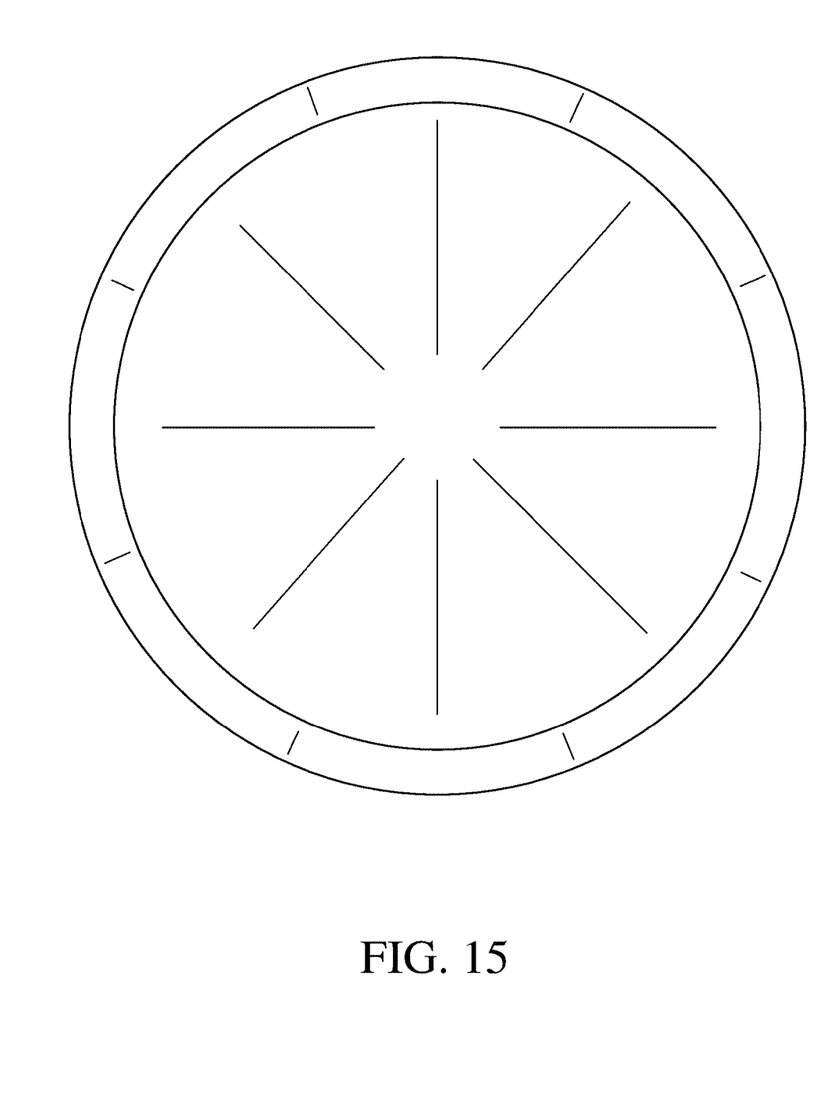
FIG. 15 is a bottom view of one example of a beverage warmer.
Figure 16:
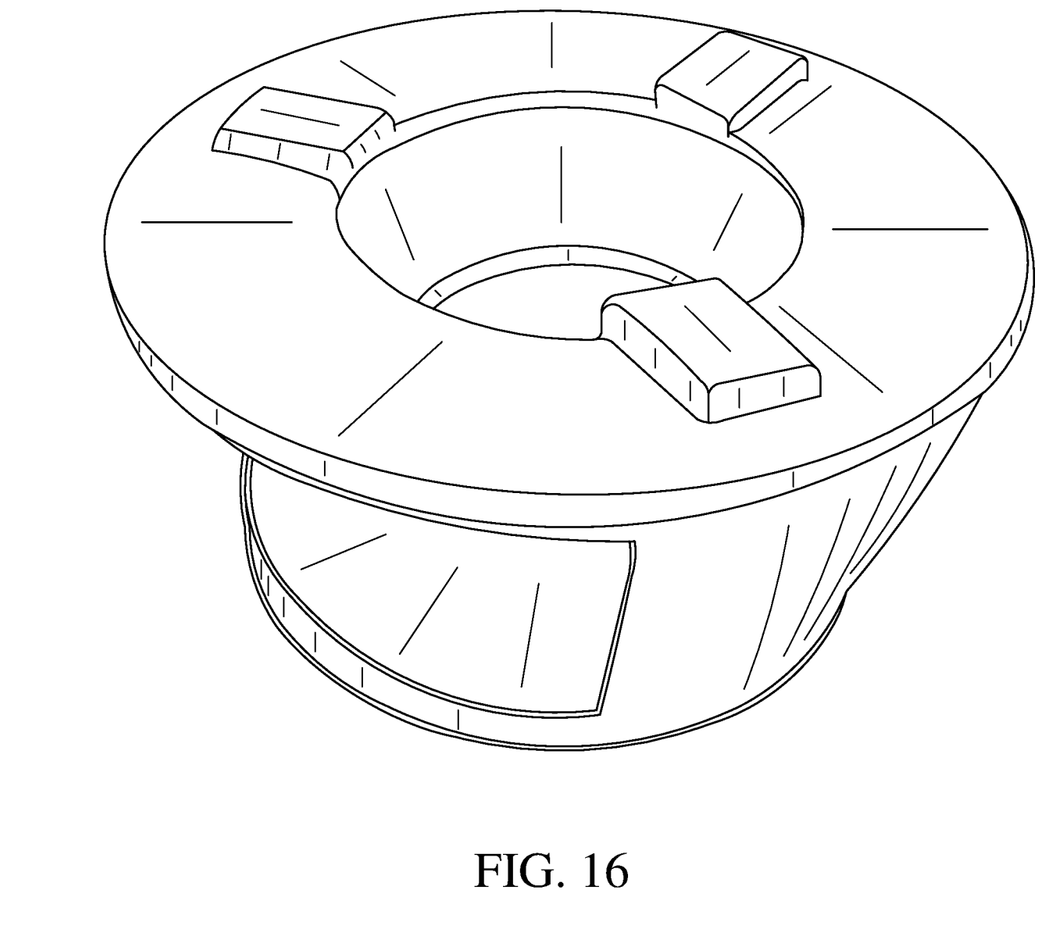
FIG. 16 is a perspective view of one example of a beverage warmer.

FIGS. 8 and 9 also show that, in one example, beverage warmer 100 is sized to receive and support tea candle 120 relative to mug 130 so that its flame does not touch the bottom of vessel 130. In addition, window 118 can be sized sufficiently large to allow a user to place the candle 120 within the cavity formed by beverage warmer 100 through window 118. Alternatively, aperture 114 may be sized to receive the candle 120 therethrough as well.

In addition, in one example, there are multiple windows 118 formed in wall 104. Similarly, window 118 can be different sizes.

Example 1 is a beverage warmer, comprising:
a ceramic base;
a ceramic, generally planar, vessel support member defining a generally planar vessel support surface defining a central aperture therein; and
a ceramic wall between the base and the vessel support member, the vessel support member and the wall defining a window therein.

Example 2 is the beverage warmer of any or all previous examples and further comprising:
a plurality of spacer tabs disposed about the central aperture on the vessel support surface and extending off the vessel support surface generally away from the base.

Example 3 is the beverage warmer of any or all previous examples wherein the spacer tabs are disposed about the central aperture without extending into the central aperture.

Example 4 is the beverage warmer of any or all previous examples wherein the tabs are generally equally spaced about the central aperture on the vessel support surface.

Example 5 is the beverage warmer of any or all previous examples wherein the base, vessel support member and the wall are formed integrally with one another.

Example 6 is the beverage warmer of any or all previous examples wherein the base, the vessel support member, the wall, and the plurality of tabs are formed integrally with one another.

Example 7 is the beverage warmer of any or all previous examples wherein the vessel support member defines the central aperture as a circular aperture.

Example 8 is the beverage warmer of any or all previous examples wherein the vessel support member is configured as an annulus.

Example 9 is the beverage warmer of any or all previous examples wherein the wall curves continuously from a first side of the window to a second side of the window.

Example 10 is the beverage warmer of any or all previous examples wherein the window extends from the base to the vessel support member.

Example 11 is the beverage warmer of any or all previous examples wherein the base has a center and wherein the wall defines the window so the window extends about the center of the base by an angle, the angle being between approximately 45 degrees and approximately 150 degrees.

Example 12 is the beverage warmer of any or all previous examples wherein the base has a center and wherein the wall defines the window so the window extends about the center of the base by an angle, the angle being between approximately 75 degrees and approximately 125 degrees.

Example 13 is the beverage warmer of any or all previous examples of any or all previous examples wherein the wall defines a single window in the curved wall.

Example 14 is a beverage warmer, comprising:
a ceramic base;
a ceramic, generally planar, annular vessel support member defining a generally planar vessel support surface defining a central aperture therein;
a ceramic wall between the base and the vessel support member, the vessel support member and the wall defining a window therein; and
a plurality of spacer tabs disposed about the central aperture on the vessel support surface and extending off the vessel support surface generally away from the base.

Example 15 is the beverage warmer of any or all previous examples wherein the spacer tabs are generally equally spaced about the central aperture without extending into the central aperture.

Example 16 is the beverage warmer of any or all previous examples wherein the base, the vessel support member, the wall, and the plurality of tabs are formed integrally with one another.

Example 17 is the beverage warmer of any or all previous examples wherein the wall curves continuously from a first side of the window to a second side of the window.

Example 18 is the beverage warmer of any or all previous examples wherein the base has a center and wherein the wall defines the window so the window extends about the center of the base by an angle, the angle being between approximately 45 degrees and approximately 150 degrees.

Example 19 is the beverage warmer of any or all previous examples wherein the wall defines a single window in the curved wall.

Example 20 is a beverage warmer, comprising:
a ceramic base;
a ceramic, generally planar, annular vessel support member defining a generally planar vessel support surface defining a central aperture therein;
a ceramic wall between the base and the vessel support member, the vessel support member and the wall defining a single window therein; and
a plurality of spacer tabs disposed about the central aperture on the vessel support surface and extending off the vessel support surface generally away from the base.

Although the present invention has been described with reference to preferred embodiments, workers skilled in the art will recognize that changes may be made in form and detail without departing from the spirit and scope of the invention.

What is claimed is:
1. A beverage warmer, comprising:
a ceramic base having a center;
a ceramic, generally planar, vessel support member defining a generally planar vessel support surface defining a central aperture therein and a periphery, the vessel support member forming an annulus between the central aperture and the periphery;
a ceramic wall extending from the base to the annulus formed by the vessel support member, the vessel support member and the wall defining a window therein, the window extending about the center of the base by an angle, the angle being between 45 degrees and 150 degrees; and wherein the window has an upper boundary defined by a portion of the periphery extending across a single camber path to reach an opposite boundary of the annulus.

2. The beverage warmer of claim 1 and further comprising:
a plurality of spacer tabs disposed about the central aperture on the vessel support surface and extending off the vessel support surface generally away from the base.

3. The beverage warmer of claim 2 wherein the spacer tabs are disposed about the central aperture without extending into the central aperture.

4. The beverage warmer of claim 2 wherein the tabs are generally equally spaced about the central aperture on the vessel support surface.

5. The beverage warmer of claim 1 wherein the base, vessel support member and the wall are formed integrally with one another.

6. The beverage warmer of claim 1 wherein the base, vessel support member, the wall, and the plurality of tabs are formed integrally with one another.

7. The beverage warmer of claim 5 wherein the vessel support member defines the central aperture as a circular aperture.

8. The beverage warmer of claim 1 wherein the wall curves continuously from a first side of the window to a second side of the window.

9. The beverage warmer of claim 1 wherein the window extends from the base to the vessel support member.

10. The beverage warmer of claim 1 wherein the wall defines a single window in the curved wall.

11. A beverage warmer, comprising:
a ceramic base having a center;
a ceramic, generally planar, annular vessel support member defining a generally planar vessel support surface having an outer periphery and defining a central aperture therein, the annular vessel support member comprising an annulus between the central aperture and the outer periphery;
a ceramic wall between the base and the vessel support member, the vessel support member and the wall defining a window therein, the window extending about the center of the base by an angle between 45 degrees and 150 degrees;
wherein the window has an upper boundary defined by a portion of the outer periphery extending across a single camber path to reach an opposite boundary of the annulus; and
a plurality of spacer tabs disposed about the central aperture on the vessel support surface and extending off the vessel support surface to define vessel contact points spaced from the vessel support surface in a direction away from the base.

12. The beverage warmer of claim 11 wherein the spacer tabs are generally equally spaced about the central aperture without extending into the central aperture.

13. The beverage warmer of claim 11 wherein the base, the vessel support member, the wall, and the plurality of tabs are formed integrally with one another.

14. The beverage warmer of claim 11 wherein the wall curves continuously from a first side of the window to a second side of the window.

15. The beverage warmer of claim 11 wherein the wall defines a single window in the curved wall.

* * * * *